June 8, 1937.  P. ZAMPOL  2,083,484
FLEXIBLE MOLD
Filed April 24, 1933
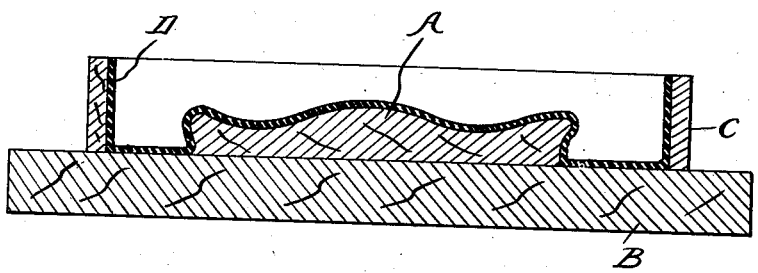
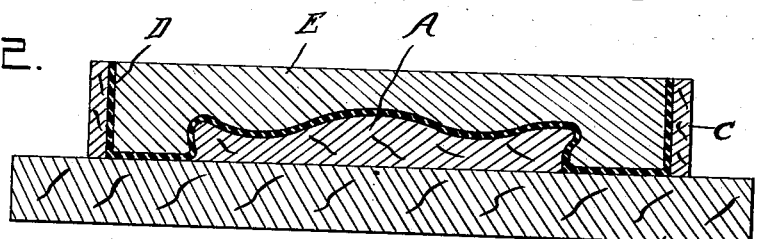
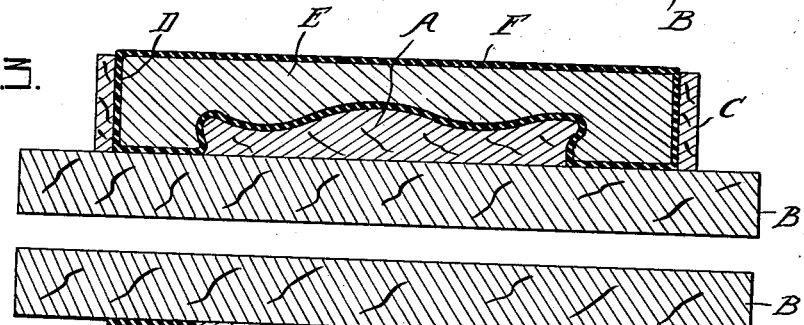
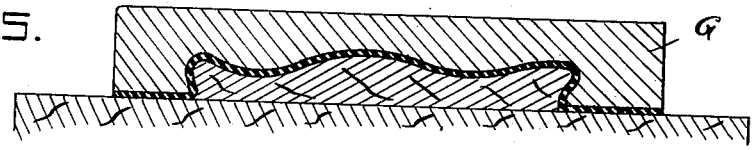
Inventor
Peter Zampol Patented June 8, 1937

2,083,484

UNITED STATES PATENT OFFICE 2,083,484

FLEXIBLE MOLD

Peter Zampol, Detroit, Mich., assignor to Permaflex Mold and Model Corporation, Detroit, Mich., a corporation of Michigan Application April 24, 1933, Serial No. 667,709

8 Claims. (Cl. 18—47)

The invention relates to flexible molds of that type permitting removal from the molded article without the necessity of the draft required with all rigid molds. Heretofore such molds have usually been formed of rubber which when cured is sufficiently soft and elastic to function in the desired manner. I have devised a construction formed of a different material which is even better adapted for the purpose than the rubber and may be manufactured at low cost, and I have also devised an exceedingly simple method of manufacture. To this end the invention consists, first, in the improved construction and second, in the method of manufacturing as hereinafter described.

In the drawing:

Figs. 1, 2 and 3 are cross sections showing the several stages in the manufacture of a flexible mold of my improved construction;

Fig. 4 is a similar view showing the manner of removing the molded article from the mold;

Fig. 5 is a view similar to Fig. 3 showing a modification.

For perfectly reproducing the pattern it is essential that the surface of the mold in contact therewith should exactly conform thereto and should be sufficiently tenacious, elastic and limited in adhesiveness to permit of stripping off intact. I therefore form this portion of the mold by applying to the face of the pattern a compound having a relatively large rubber content and which is preferably applied by spraying. Specifically, I employ a compound the chief ingredient of which is latex and which is associated with certain other materials such for instance as casein glue, which modify its characteristics to conform to those above described. This surface portion must then be reinforced by a body having sufficient rigidity to hold the mold in form during the casting process, but nevertheless having sufficient elasticity and flexibility for removal from the pattern even where the latter has undercut portions. For this body portion I may employ different materials, among which are first, the same material as is used for the surface, having incorporated therein a relatively large amount of filler, such for instance as wood flour; second, a gelatinous body of a consistency possessing the required flexibility and elasticity.

Various gelatinous bodies having the proper water content are suitable for forming a matrix or mold and possess the required flexibility and elasticity. However, such material is not suitable for forming the entire mold, as it is too adhesive and is lacking in the tenacity required for easily stripping from the face of the pattern. Moreover, such gelatinous compounds will gradually lose their water content, thereby changing in form and becoming rigid. I have discovered that by first forming the surface portion of the mold of the latex compound above described and then reinforcing this by a gelatinous compound which is completely enveloped in a waterproof skin, I obtain a mold permanently retaining the desired characteristics.

As shown in Fig. 1, A is a pattern which may be laid upon a base B and provided with a surrounding flask ring C. The surface of this pattern as well as the inner face of the flask is then coated by being sprayed with my latex compound to form a skin D thereon. After this has dried, the flask is filled with a gelatinous body E as shown in Fig. 2 and the upper surface of this body is then covered with a complementary portion of the latex skin as indicated at F, Fig. 3. This will complete the structure which is then capable of use in the molding of exact reproductions of the pattern as shown in Fig. 4. After the plastic material placed in the mold has hardened, the mold is removed by flexing it which withdraws all undercut portions and progressively strips the latex skin from the molded surface.

A formula suitable for forming the protective skin comprises commercial latex having a water content of from 40% to 45%; casein glue from .25% to 5%; coloring matter from 1.2% to 2.5%; chrome alum (chromium and potassium sulphate) from 1% to 10%.

The gelatinous body may be formed from the common commercial glues having an additional water content of 5% to 30%.

In the modified construction shown in Fig. 5 the body of the mold is formed of latex compound such as above described to which is added a filler such as wood flour to as high as 50%. This will form a dough or plastic substance which may be spread over the surface coating of the pattern as shown in Fig. 5, at G.

What I claim as my invention is:

1. A flexible mold comprising a skin conforming to the surface of the pattern having an undercut portion, said skin formed of a flexible elastic waterproof material, a reinforcing body for said skin formed of a solid and continuous flexible elastic gelatinous compound and a complementary skin of the flexible elastic waterproof material to completely enclose the gelatinous material and to prevent the same from hardening.

2. A flexible mold comprising a skin conforming to the surface of the pattern having an undercut portion, said skin formed of a compound of latex and casein glue in proportion based on the rubber content of the latex of from .25% to 1% of the casein glue, and a reinforcing body of a flexible elastic material.

3. A flexible mold comprising a skin conforming to the surface of the pattern having an undercut portion, said skin formed of a compound comprising latex, casein glue and chrome alum in proportions based on the rubber content of the latex of from .25% to 1% casein glue and from .1% to 5% of the chrome alum, and a reinforcing body for said skin formed of flexible elastic material.

4. A flexible mold comprising a skin conforming to the surface of the pattern having an undercut portion, said skin formed of a compound comprising latex from .25% to 1% casein glue and .1% to 5% chrome alum, and a reinforcing body of gelatinous material completely enclosed in and waterproofed by said latex skin.

5. A flexible mold comprising a skin conforming to the surface of the pattern having an undercut portion, said skin formed of a compound comprising latex formed of .25% to 1% casein glue and .1% to 5% chrome alum, and a reinforcing body of the same material with a filler mixed therein.

6. A flexible mold comprising a skin conforming to the surface of the pattern formed of a compound of latex, a reinforcing body for said skin formed of a solid and continuous flexible elastic gelatinous compound, and a complementary skin of said latex compound completely enclosing the gelatinous material to protect the same.

7. A flexible mold comprising a skin conforming to the surface of the pattern formed of a compound of latex and casein glue in the proportion based on the rubber content of the latex of from .25% to 1% of the casein glue and a reinforcing body for said skin formed of a solid continuous flexible elastic gelatinous compound completely enclosed by said skin and protected thereby.

8. A flexible mold comprising a skin conforming to the surface of the pattern having an undercut portion, said skin being formed of a compound of latex, a reinforcing body for said skin formed of a solid and continuous flexible elastic gelatinous compound and a complementary skin of flexible elastic waterproof material completely enclosing the gelatinous material to prevent the same from hardening.

PETER ZAMPOL.